US008158903B2

(12) United States Patent
Meier

(10) Patent No.: US 8,158,903 B2
(45) Date of Patent: Apr. 17, 2012

(54) METHOD FOR REPAIRING OR MANUFACTURING A COMPONENT

(75) Inventor: Reinhold Meier, Dorfen (DE)

(73) Assignee: MTU Aero Engines GmbH, Munich (DE)

(*) Notice: Subject to any disclaimer, the term of this patent is extended or adjusted under 35 U.S.C. 154(b) by 754 days.

(21) Appl. No.: 11/632,356

(22) PCT Filed: Jul. 16, 2005

(86) PCT No.: PCT/DE2005/001257
§ 371 (c)(1),
(2), (4) Date: Jan. 11, 2007

(87) PCT Pub. No.: WO2006/010357
PCT Pub. Date: Feb. 2, 2006

(65) Prior Publication Data
US 2007/0235505 A1    Oct. 11, 2007

(30) Foreign Application Priority Data
Jul. 24, 2004    (DE) .......................... 10 2004 036 066

(51) Int. Cl.
*B23K 26/00*    (2006.01)
*B23K 13/01*    (2006.01)
*B23P 6/00*    (2006.01)

(52) U.S. Cl. .............. 219/121.63; 219/121.64; 219/617; 29/402.11

(58) Field of Classification Search ............. 219/121.63, 219/121.64, 612, 617, 76.1–76.16; 416/213 R; 228/119; 29/402.1, 402.11, 402.3, 402.16, 29/402.163; 427/596, 597
See application file for complete search history.

(56) References Cited

U.S. PATENT DOCUMENTS
3,083,446 A * 4/1963 Stalker ...................... 29/889.72
(Continued)

FOREIGN PATENT DOCUMENTS
EP    1 138 431    10/2001
(Continued)

OTHER PUBLICATIONS
Khromchenko F. A. et al., "Technology for Repairing Working Blades of Steam Turbines. Part 2. Repair by the Combined Welding and Surfacing Method", Welding International, Woodhead Publishing Limited, Abington, Cambridge, GB, vol. 13, No. 8, 1999, pp. 660-664, XP000847359, ISSN: 0950-7116, Figs. 1, 5.

*Primary Examiner* — M. Alexandra Elve
*Assistant Examiner* — Hemant Mathew
(74) *Attorney, Agent, or Firm* — W. F. Fasse; W. G. Fasse

(57) ABSTRACT

In a method of repairing a structural component, especially a stator-side structural component such as a housing or a guide vane ring of a gas turbine, a damaged section is separated-out along a separating line and removed from the structural component, and a new section that replaces the removed damaged section is connected with the structural component by welding along the separating line to produce a weld seam. The damaged section is separated-out from the structural component so as to minimize the length of the separating line and thus the weld seam. Depending on the material thickness distribution of the component along the separating line, material is removed from the structural component to provide the most uniform possible material thickness along the weld seam. After connecting the new section with the structural component by welding, at least the removed material is renewed by laser powder deposit welding.

19 Claims, 2 Drawing Sheets

U.S. PATENT DOCUMENTS

| | | | |
|---|---|---|---|
| 3,576,065 A * | 4/1971 | Frazier | 29/402.18 |
| 4,003,115 A * | 1/1977 | Fisher | 29/889 |
| 4,050,133 A * | 9/1977 | Cretella et al. | 148/527 |
| 4,657,171 A | 4/1987 | Robins | |
| 4,726,104 A | 2/1988 | Foster et al. | |
| 4,743,733 A | 5/1988 | Mehta et al. | |
| 4,804,815 A | 2/1989 | Everett | |
| 4,841,117 A | 6/1989 | Koromzay | |
| 4,903,888 A | 2/1990 | Clark et al. | |
| 5,067,234 A * | 11/1991 | Fraser | 29/889.1 |
| 5,142,778 A | 9/1992 | Smolinski et al. | |
| 5,233,150 A * | 8/1993 | Schneebeli et al. | 219/76.14 |
| 5,479,704 A * | 1/1996 | Richter et al. | 29/889.1 |
| 5,554,837 A * | 9/1996 | Goodwater et al. | 219/121.63 |
| 5,697,151 A | 12/1997 | Werner et al. | |
| 5,701,669 A | 12/1997 | Meier | |
| 5,913,555 A | 6/1999 | Richter et al. | |
| 6,118,098 A * | 9/2000 | Amos et al. | 219/137 R |
| 6,321,448 B1 * | 11/2001 | Makino et al. | 29/889.22 |
| 6,332,272 B1 * | 12/2001 | Sinnott et al. | 29/889.1 |
| 6,364,971 B1 * | 4/2002 | Peterson et al. | 148/525 |
| 6,438,838 B1 * | 8/2002 | Meier et al. | 29/889.1 |
| 6,542,843 B1 * | 4/2003 | Metzinger et al. | 702/113 |
| 6,616,408 B1 * | 9/2003 | Meier | 416/193 A |
| 6,673,169 B1 * | 1/2004 | Peterson et al. | 148/524 |
| 7,009,137 B2 * | 3/2006 | Guo | 219/121.64 |
| 2002/0091459 A1 * | 7/2002 | Meier | 700/159 |
| 2004/0084423 A1 * | 5/2004 | Grossklaus et al. | 219/121.45 |
| 2006/0243709 A1 | 11/2006 | Born et al. | |

FOREIGN PATENT DOCUMENTS

| | | |
|---|---|---|
| JP | 62-282796 | 12/1987 |
| JP | 64-034590 | 2/1989 |
| JP | 10-080767 | 3/1998 |
| WO | 2001/051772 | 7/2001 |
| WO | 2004/076119 | 9/2004 |

* cited by examiner

US 8,158,903 B2

METHOD FOR REPAIRING OR MANUFACTURING A COMPONENT

FIELD OF THE INVENTION

The invention relates to a method for repairing a structural component, especially a stator-side structural component of a gas turbine, and further relates to a method for the production of such a structural component.

BACKGROUND INFORMATION

In the repairing of structural components, especially of stator-side structural components of a gas turbine, it can be necessary to separate or remove damaged sections out of a structural component that is to be repaired, and to replace such damaged sections with a new section. In structural components that comprise considerable material thickness fluctuations, as is the case for guide vane rings of a gas turbine for example, the repair proceeds in that the damaged section that is to be renewed is separated out of the structural component in such a manner so that the most uniform possible material thickness exists along the separating seam and thus along the later weld seam. Thereby it is to be ensured that the welding can be carried out as uniform as possible and optimally along the entire weld seam. This process, which is known from the state of the art, however, has the disadvantage, that very long and complex separating seams and therewith later weld seams can arise depending on the section that is to be separated out of the structural component to be repaired and the material thickness distribution of the structural component. Moreover, due to such complex as well as long weld seams, extensive preparation steps as well as post-machining or post-processing steps can be necessary on the structural component to be repaired. This is overall disadvantageous. Since similarly in the production of a new part, different sections of a structural component typically must be connected with one another by welding, therefore similar problems arise in the new production or fabrication of structural components.

SUMMARY OF THE INVENTION

Beginning from this, it is the underlying problem of the present invention to provide a novel method for repairing or producing a structural component, especially a stator-side structural component of a gas turbine.

According to the repair method of the invention, the damaged section is separated out from the structural component to be repaired in such a manner so that the length of a separating seam and therewith a later weld seam is minimized, whereby material is removed from the structural component depending on the material thickness distribution along the separating seam for providing a most uniform possible material thickness along the later weld seam, and whereby, after the connecting of the structural component with the new section, at least the removed material is renewed by laser powder deposit welding.

In the sense of the present invention, it is proposed, to carry out the separating seam and therewith the later weld seam with the smallest length, and particularly substantially independently of the material thickness distribution of the structural component to be repaired. In order to nonetheless provide the most uniform possible material thickness along the weld seam during the later welding-on of a new section replacing the separated-out section, material is removed from the structural component to be repaired in the area of the separating seam, whereby at least this removed material is renewed by laser powder deposit welding after the connection of the structural component with the new section. This has the advantage that complex geometries of separating seams and weld seams can be avoided. Accordingly, a structural component to be repaired does not need to be separated into many individual parts. Hereby, among others, cost advantages arise.

According to an advantageous further development of the invention, in order to provide an optimal weld seam material thickness along the later weld seam, depending on the material thickness distribution along the separating seam, material is removed from the structural component in areas of the structural component in which the material thickness is larger than the optimal weld seam material thickness, whereas material is applied onto the structural component in areas of the structural component in which the material thickness is smaller than the optimal weld seam material thickness.

The inventive method for producing a structural component involves welding along a joint between two component sections to form a weld seam that connects the two component sections, wherein the two component sections have a uniform material thickness along the joint, i.e. along the weld seam. Then the method further involves applying material by laser deposit welding to provide defined component contours having a thickness greater than the uniform material thickness.

BRIEF DESCRIPTION OF THE DRAWINGS

An example embodiment of the invention is explained more closely in connection with the drawings, without being limited thereto. Therein.

DETAILED DESCRIPTION OF AN EXAMPLE EMBODIMENT OF THE INVENTION

In the following, the present invention is described in greater detail with reference to FIGS. 1 to 4.

Figure 1:
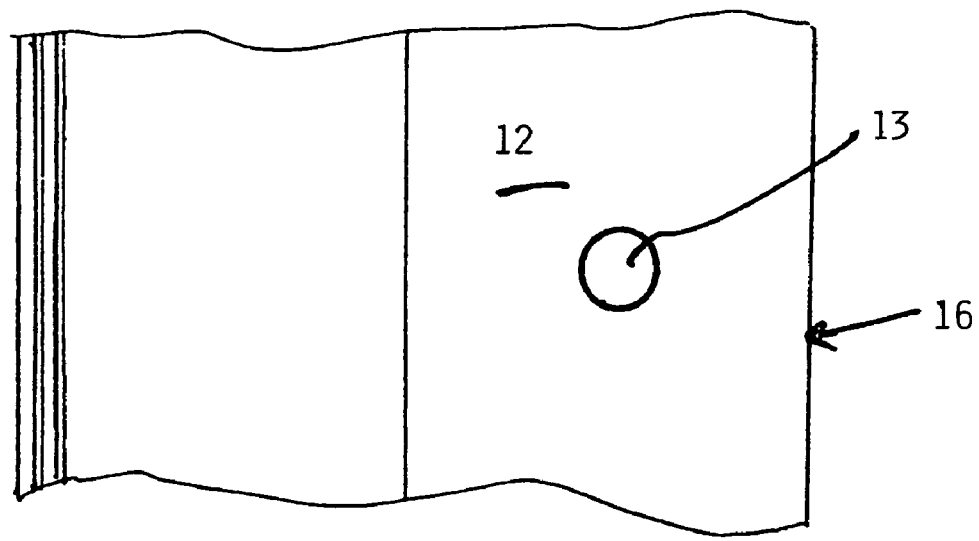
FIG. 1 shows a cutaway partial top plan view onto a stator-side structural component of a gas turbine, namely onto a guide vane ring, that is to be repaired.
Figure 2:
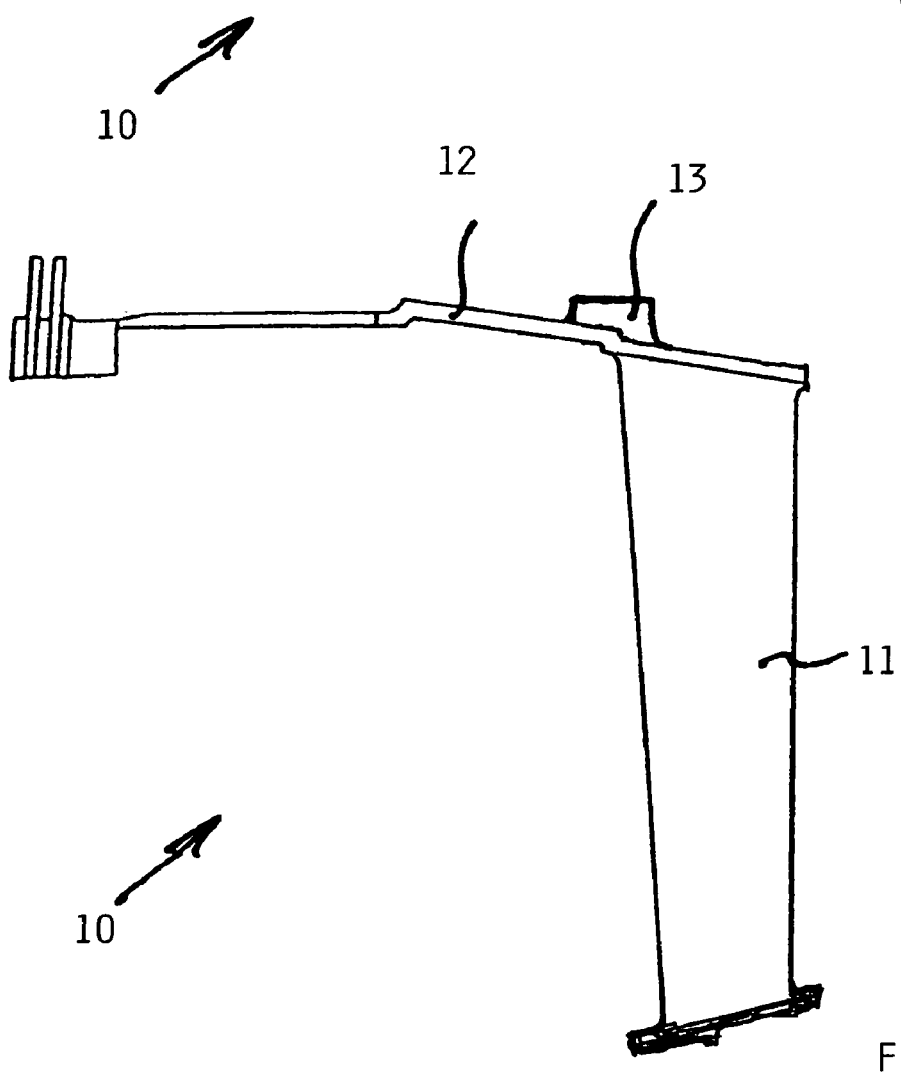
FIG. 2 shows a cutaway partial side view onto the stator-side structural component of FIG. 1 that is to be repaired.

FIGS. 1 and 2 show a cutout portion of a stator-side guide vane ring 10 of a gas turbine, whereby the guide vane ring 10 comprises plural guide vanes 11 that extend in the radial direction and are spaced apart from one another in the circumferential direction. As can be seen in FIGS. 1 and 2, the guide vane ring 10, in the area of a radially outwardly lying section 12, has a projection or protrusion 13 that protrudes outwardly beyond the section 12, whereby the protrusion 13 represents a material thickening. Already from this it follows that the guide vane ring 10 has a non-uniform material thickness distribution in the area of the section 12, namely has sections with a relatively small material thickness and has the protrusion 13 with a relatively large material thickness.

In the following it is assumed as a starting point that one of the guide vanes 11 shall be exchanged for the repair of the guide vane ring 10 shown in FIGS. 1 and 2. Now for example, if the guide vane 11 shown in FIG. 2 is to be exchanged, then it is directly apparent, that the shortest separating seam for separating-out the guide vane 11 out of the guide vane ring 10 would extend through the area of the protrusion 13. Since, however, the separating seam forms the later weld seam, and moreover non-uniform material thicknesses in the area of the weld seam are disadvantageous, a separating seam that passes around the area of the protrusion 13 would be selected according to the state of the art. Thereby, among other things, there arises a complexly formed separating seam as well as later weld seam.

In the sense of the present invention, it is proposed that the guide vane 11, which is to be replaced, shall be separated out of the guide vane ring 10, which is to be repaired, in such a manner so that a shortest possible separating seam and thus later weld seam arises.

Figure 3:
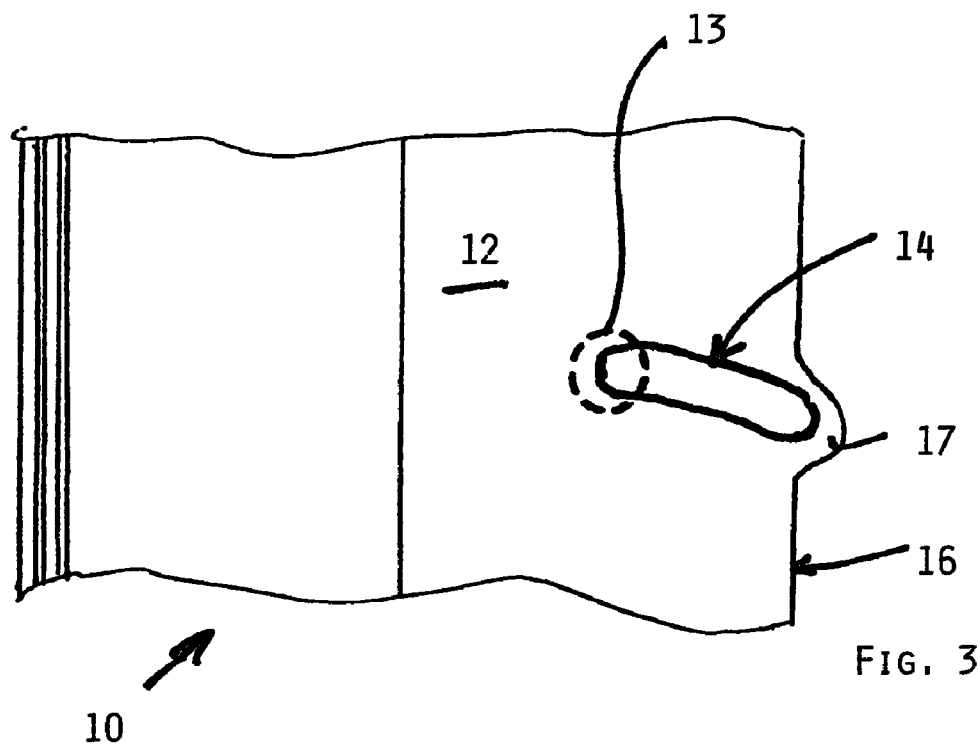
FIG. 3 shows a cutaway partial top plan view onto the stator-side structural component of FIG. 1 that is to be repaired, for clearly representing the inventive method.
Figure 4:
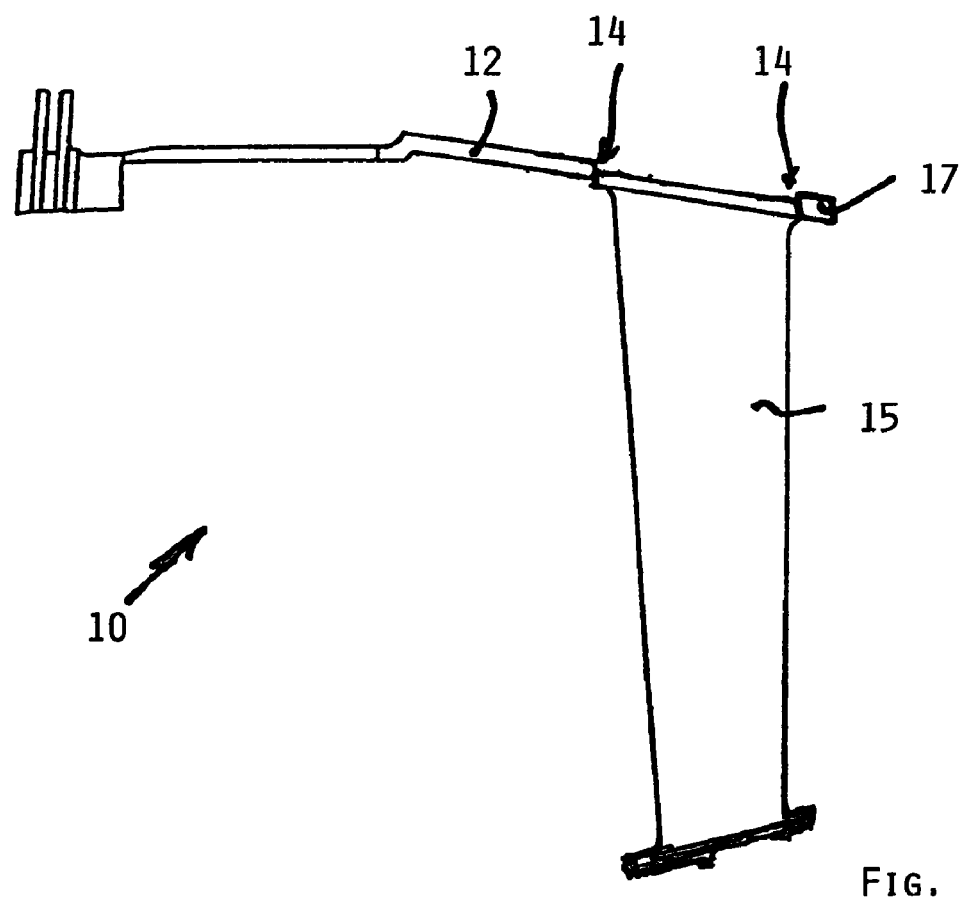
FIG. 4 shows a cutaway partial side view onto the stator-side structural component of FIG. 3 that is to be repaired.

Such a minimal separating seam or weld seam is identified with the reference number 14 in FIG. 3. It can be seen in FIG. 3 that this separating seam 14 and therewith the later weld seam extends through the area of the protrusion 13. In order to nonetheless provide a most uniform possible material thickness over the area of the later weld seam independently of the material thickness distribution of the original structural component, material is removed in the sense of the present invention along the separating seam and therewith the later weld seam. In the example embodiment of FIG. 3, the protrusion 13 is removed. This is shown by FIG. 4, which shows the section 12 without the protrusion 13. Moreover FIG. 4 shows a guide vane 15, which replaces the guide vane 11 that is to be separated-out. The guide vane 15 has a material thickness matched or adapted to the section 12 in the area of the weld seam 14. Hereby it is ensured that a weld seam with optimal characteristics can be provided, without the necessity of complexly guided separating seams or weld seams.

It thus lies in the present invention, to remove material in areas of the structural component that are characterized by a material thickening in the area of the separating seam, depending on the material thickness distribution along the shortest selected separating seam, for providing an optimal weld seam material thickness along the later weld seam. In such areas of the separating seam, in which the material thickness is thus greater than an optimal weld seam material thickness, material is removed from the structural component. It can, however, also be the case, that the structural component to be repaired comprises, in a section of the separating seam, a material thickness that is smaller than the optimal weld seam material thickness. In this case it is possible to apply material onto the structural component in the area of the separating seam and therewith later weld seam by laser powder deposit welding.

As can be seen especially from FIG. 3, when separating-out the guide vane 11 out of the guide vane ring 10, the separating seam 14 would extend into the area of a lateral bounding contour 16 of the section 12, and would thus end "in free open space". A separating seam as well as a later weld seam, which is not enclosed on all sides by material, but rather ends "in free open space" can lead to considerable deformations of the structural component. Therefore, in the sense of the present invention, a material thickening 17 is applied by laser powder deposit welding in the area of the bounding contour 16 before the separating-out of the guide vane 11 out of the guide vane ring 10, in order to ensure that the separating seam 14 and therewith later weld seam is enclosed on all sides by material.

Also this lies in the basic idea of the invention, to ensure an optimal weld seam material thickness in the entire area of the weld seam, either by removing or by applying material in the area of the structural component to be repaired, namely in the area of the separating seam 14 or weld seam.

At this point it is mentioned that the removal of material as well as the application of material, if applicable, for providing the most uniform possible material thickness along the later weld seam 14 can be carried out either before the separating-out of the guide vane 11 to be replaced or after the separating-out thereof. If material must be applied in order to avoid separating seams ending "in free open space", then this takes place before the separating-out of the structural component section to be replaced. If, to the contrary, material must be removed, then this takes place after the separating-out of the structural component, since in this manner removal work in the area of the structural component section to be replaced can be avoided.

After the connecting of the new guide vane 15 (see FIG. 4) with the guide vane ring 10 by welding, the material that was removed to provide the uniform material thickness along the weld seam 14 is renewed by laser powder deposit welding. In the illustrated example embodiment this means that the protrusion 13, which was removed for providing the optimal weld seam material thickness, is renewed by laser powder deposit welding after the welding of the guide vane 15 with the guide vane ring 10.

If, to the contrary, material was applied for providing the optimal weld seam material thickness, then, in the sense of the present invention, this is removed after the welding. In the illustrated example embodiment this would mean that after the connecting of the guide vane 15 with the guide vane ring 10, the material thickening 17 is again removed, so that the continuous bounding contour 16 is reproduced.

Following the application or removal of material, a surface machining or processing can be carried out, in order to ensure flow-technically defined component contours of the repaired structural component, namely of the repaired guide vane ring.

Accordingly, with the inventive method, complex geometries of separating seams as well as weld seams are avoided in the repair of structural components.

This similarly pertains for the new production of a structural component. Local protrusions or material thickenings can be produced by laser powder deposit welding subsequently after the connecting. Arising herefrom are significant cost advantages, as well as logistic advantages and qualitative advantages, because on the one hand simple weld seams and on the other hand weld seams with a uniform material thickness are provided.

The invention claimed is:

1. A method of repairing a structural component, comprising the steps:
   a) providing a structural component that has a damaged section including damage, and that has a varying component thickness adjoining said damaged section;
   b) determining a desired welding thickness range of said structural component for a welding operation on said structural component;
   c) determining a separation line around said damaged section in said structural component such that said damaged section can be separated along said separation line and removed from a remainder of said structural component, wherein said separation line extends to a bounding surface of said structural component so that said separation line cannot form a first continuous closed loop within said structural component;
   d) adding supplemental material onto said bounding surface and extending said separation line into said supplemental material so that said separation line forms a second continuous closed loop within said structural component and said supplemental material;
   e) forming a separation seam along said separation line and thereby separating said damaged section from said remainder of said structural component along said separation line, and then removing said damaged section from said remainder of said structural component;

f) removing material from said structural component in a first area along said separation line in which said varying component thickness comprises a first area thickness greater than said desired welding thickness range so as to reduce said first area thickness of said structural component in said first area along said separation line to fall within said desired welding thickness range, and/or adding material to said structural component in a second area along said separation line in which said varying component thickness comprises a second area thickness less than said desired welding thickness range so as to increase said second area thickness of said structural component in said second area along said separation line to fall within said desired welding thickness range;

g) after said step e), arranging a replacement section fitting into said remainder of said structural component along said separation line to replace said damaged section that has been separated and removed, wherein said replacement section has, along said separation line, a thickness within said desired welding thickness range;

h) after said steps f) and g), welding said replacement section to said remainder of said structural component along said separation line to form along said separation line a weld seam that joins said replacement section to said remainder of said structural component; and i) after said step h), adding material to said replacement section and to said structural component in said first area so as to form a first component surface contour in said first area wherein said thickness of said replacement section and said first area thickness of said structural component in said first area along said separation line are increased to greater than said desired welding thickness range, and/or removing material from said replacement section and said structural component in said second area so as to form a second component surface contour in said second area wherein said thickness of said replacement section and said second area thickness of said structural component in said second area along said separation line are reduced to less than said desired welding thickness range.

2. The method according to claim 1, wherein said structural component is a component of a stator arrangement of a gas turbine apparatus.

3. The method according to claim 1, wherein said step c) comprises determining a location and path of said separation line to have a minimum necessary length around said damaged section in said structural component such that said damaged section can be separated along said separation line and removed from said remainder of said structural component.

4. The method according to claim 1, wherein said determining of said location and said path of said separation line is carried out without regard to and independent of said varying component thickness.

5. The method according to claim 1, wherein said determining of said separation line is carried out without regard to and independent of said varying component thickness.

6. The method according to claim 1, wherein said adding of said material in said step f) and/or said adding of said material in said step i) is carried out by laser deposit welding.

7. The method according to claim 1, wherein said removing of said material in said step f) and/or said removing of said material in said step i) is carried out by surface machining.

8. The method according to claim 1, wherein said adding of said material and/or said removing of said material in said step f) is carried out so as to make said first area thickness and/or said second area thickness as uniform as possible within said desired welding thickness range along said separation line.

9. The method according to claim 1, wherein said step f) comprises said removing of said material, said step i) comprises said adding of said material, and said adding of said material in said step i) adds an amount and thickness of said material corresponding to an amount and thickness of said material removed in said step f).

10. The method according to claim 1, wherein said step f) comprises said adding of said material, step i) comprises said removing of said material, and said removing of said material in said step i) removes said material that was added in said step f).

11. The method according to claim 1, wherein said step b) comprises determining said desired welding thickness range as an optimal weld seam material thickness along said weld seam, said step f) comprises both said removing of said material in said first area and said adding of said material in said second area, and said step i) comprises both said adding of said material in said first area and said removing of said material in said second area.

12. The method according to claim 1, wherein said step f) is carried out before said step e).

13. The method according to claim 1, wherein said step f) is carried out after said step e).

14. The method according to claim 1, further comprising, after said step h), applying additional material onto said replacement section by laser powder deposit welding so as to form on said replacement section a desired component surface contour.

15. The method according to claim 14, further comprising carrying out a surface machining of said additional material on said replacement section so as to machine said desired component surface contour to a finished component surface contour.

16. The method according to claim 1, further comprising carrying out a surface machining of said material that was added in said first area in said step i) so as to machine said first component surface contour to a finished component surface contour.

17. The method according to claim 1, further comprising removing said supplemental material after said step h).

18. The method according to claim 1, further comprising, before said step g), a step of providing as said replacement section a solid member having a configuration corresponding to said damaged section but without said damage.

19. The method according to claim 1, wherein said structural component is a guide vane ring of a gas turbine, wherein said damaged section is a damaged guide vane of said guide vane ring, and wherein said method further comprises, before said step g), a step of providing as said replacement section a replacement guide vane to replace said damaged guide vane.

* * * * *